(12) United States Patent
Korah et al.

(10) Patent No.: US 9,342,393 B2
(45) Date of Patent: May 17, 2016

(54) EARLY FABRIC ERROR FORWARDING

(75) Inventors: Shino Korah, Austin, TX (US);
Jeetendrasingh Dungar, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 13/995,513

(22) PCT Filed: Dec. 30, 2011

(86) PCT No.: PCT/US2011/068009
§ 371 (c)(1),
(2), (4) Date: Jun. 19, 2013

(87) PCT Pub. No.: WO2013/101140
PCT Pub. Date: Jul. 4, 2013

(65) Prior Publication Data
US 2013/0318405 A1    Nov. 28, 2013

(51) Int. Cl.
*G06F 11/00* (2006.01)
*G06F 11/07* (2006.01)

(52) U.S. Cl.
CPC ........ *G06F 11/0766* (2013.01); *G06F 11/0724* (2013.01); *G06F 11/0784* (2013.01)

(58) Field of Classification Search
CPC ............ G06F 11/0766; G06F 11/0784; G06F 11/0724; G06F 11/0751
See application file for complete search history.

(56) References Cited

U.S. PATENT DOCUMENTS

| 2003/0056155 A1* | 3/2003 | Austen et al. .................. 714/45 |
| 2004/0019733 A1* | 1/2004 | Garinger et al. ............. 710/314 |
| 2005/0081114 A1* | 4/2005 | Ackaret et al. ................ 714/42 |
| 2007/0088988 A1* | 4/2007 | Gupta et al. ................... 714/48 |

(Continued)

FOREIGN PATENT DOCUMENTS

EP    2189911 A1    5/2010

OTHER PUBLICATIONS

International Search Report and Written Opinion for International Application No. PCT/US2011/068009 mailed Sep. 28, 2012.

(Continued)

*Primary Examiner* — Yolanda L Wilson
(74) *Attorney, Agent, or Firm* — Trop, Pruner & Hu, P.C.

(57) ABSTRACT

An embodiment includes a processor, included in a first die, detecting a first hardware error (e.g., memory corruption error). The processor formulates a first error message based on the detected first error. The processor may forward the first error message, via a first fabric included on the first die, to a first intellectual property (IP) agent or block, also included in the first die. This may be done using an in-band message, such as one that adheres to the integrated on-chip system fabric (IOSF) specification. The first IP agent may issue an error message that may, for example, alert a user to the error in a manner that is relatively close in time when the error first occurs. This may facilitate better error analysis. The first IP agent may include a processor (e.g., graphics processor), controller (e.g., power management controller), and the like. Other embodiments are described herein.

19 Claims, 6 Drawing Sheets

(56) References Cited

U.S. PATENT DOCUMENTS

2008/0126852 A1    5/2008  Brandyberry et al.
2008/0141077 A1*   6/2008  Swanson et al. ............... 714/48
2008/0297129 A1   12/2008  Nagasaki et al.
2011/0080920 A1    4/2011  Klinglesmith et al.
2011/0320892 A1*  12/2011  Check et al. .................. 714/723
2013/0318405 A1*  11/2013  Korah et al. ................... 714/48

OTHER PUBLICATIONS

Stokes, Jon; "Small Wonder: Inside Intel's Silyerthorne Ultramobile CPU"; Published Feb. 5, 2008; pp. 1-4; http://arstechnica.com/gadgets/2008/02/small-wonder-inside-intels-silverthorne-ultramobile-cpu/.

* cited by examiner

```
While(1){
Read fault/exception status register
If (register bit set){
   Generate packet for fabric message with
        Destination ID = PMC (power management controller)
        Source ID = processor
        Opcode message = 0xf3
Send_fabric_message()
}
Else{
Do_nothing();
}
}
```

FIG. 6

EARLY FABRIC ERROR FORWARDING

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (hereafter the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (hereafter the PCI specification).

Such designs are highly segmented due to varying requirements from the server, desktop, mobile, embedded, ultramobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks or agents on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. This is so, as a given IP block typically needs to be re-designed to accommodate interface and signaling requirements of a given SoC.

Even when different IP blocks are successfully incorporated into a SoC, problems persist. For example, when a processor hardware error occurs the error can be slow to be recognized. Since the error is recognized long after it occurs, the error's point of origin can be difficult to ascertain. More specifically, the error may be slow to be recognized because the error must propagate through multiple layers of hardware and software before becoming "visible" to the user at the system level. This slow error propagation causes error analysis difficulty because the analysis must "back track" the hardware failure back to the time of occurrence.

BRIEF DESCRIPTION OF THE DRAWINGS

Features and advantages of embodiments of the present invention will become apparent from the appended claims, the following detailed description of one or more example embodiments, and the corresponding figures, in which:

FIG. 6 includes a pseudocode example for message processing in an embodiment of the invention.

DETAILED DESCRIPTION

Figure 1:
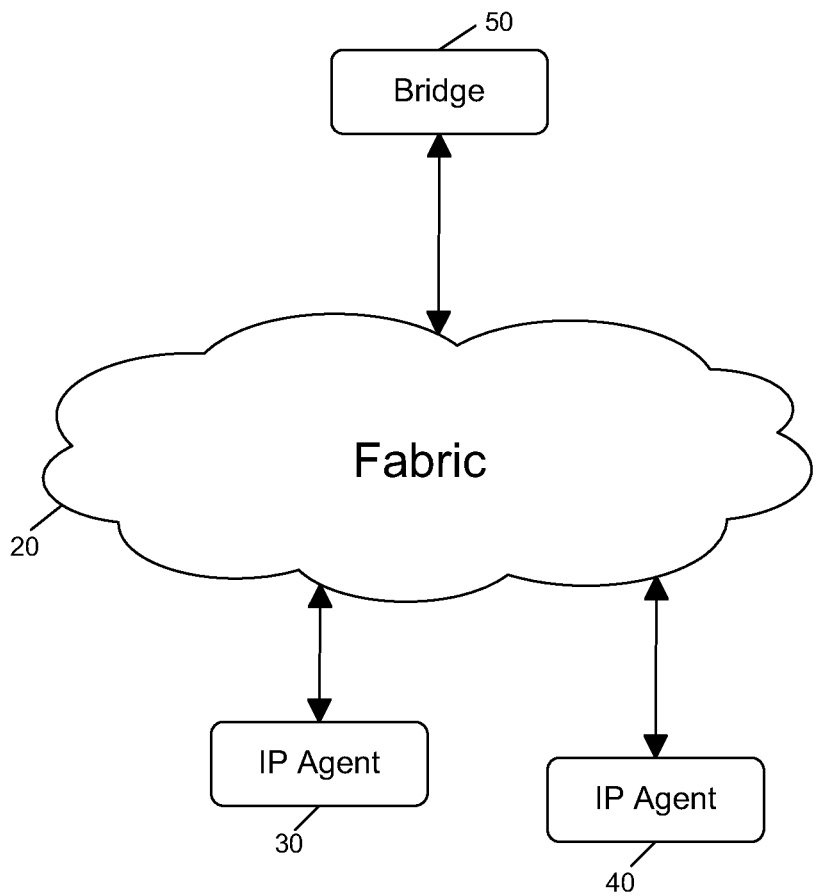
FIG. 1 is a block diagram of a basic interconnect architecture in accordance with an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment includes a processor, included in a first die, detecting a first hardware error (e.g., memory corruption error). The processor formulates a first error message based on the detected first error. The processor (e.g., one or more cores of a multi-processor core) may forward the first error message, via a first fabric included on the first die, to a first IP agent or block, also included in the first die. This may be done using an in-band message, such as one that adheres to the integrated on-chip system fabric (IOSF) specification (discussed below). The first IP agent may issue an error message that may, for example, alert a user to the error in a manner that is relatively close in time when the error first occurs. This may facilitate better error analysis. The first IP agent may include a processor (e.g., graphics processor), controller (e.g., power management controller), and the like.

Embodiments can be used in many different types of systems. As examples, implementations described herein may be used in connection with semiconductor devices such as processors or other semiconductor devices that can be fabricated on a single semiconductor die. In particular implementations, the device may be a SoC or other advanced processor or chipset that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an IOSF specification issued by a semiconductor manufacturer to provide a standardized on-die interconnect protocol for attaching IP blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces.

Figure 2:
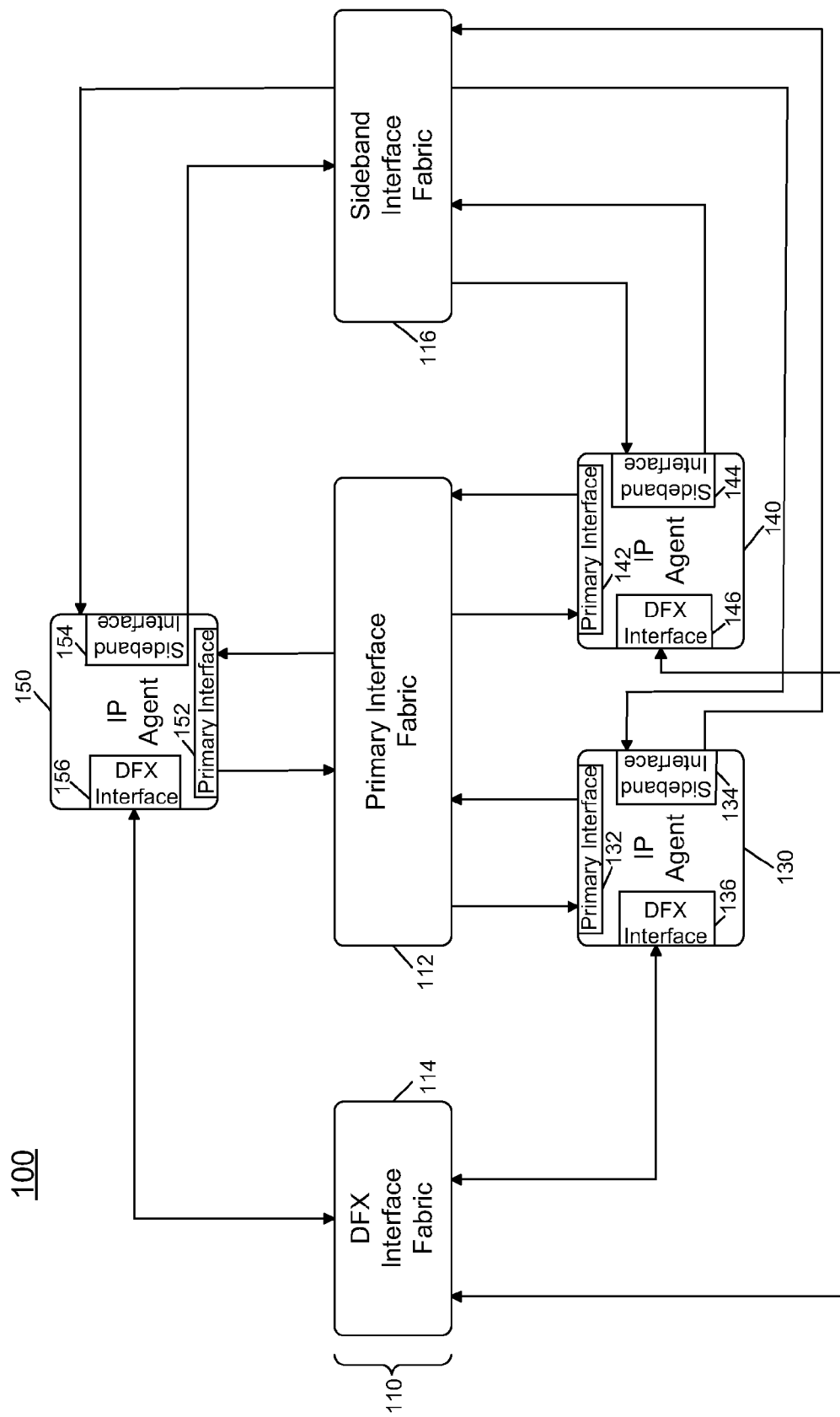
FIG. 2 is a block diagram of further details of an interconnect architecture in accordance with an embodiment of the invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
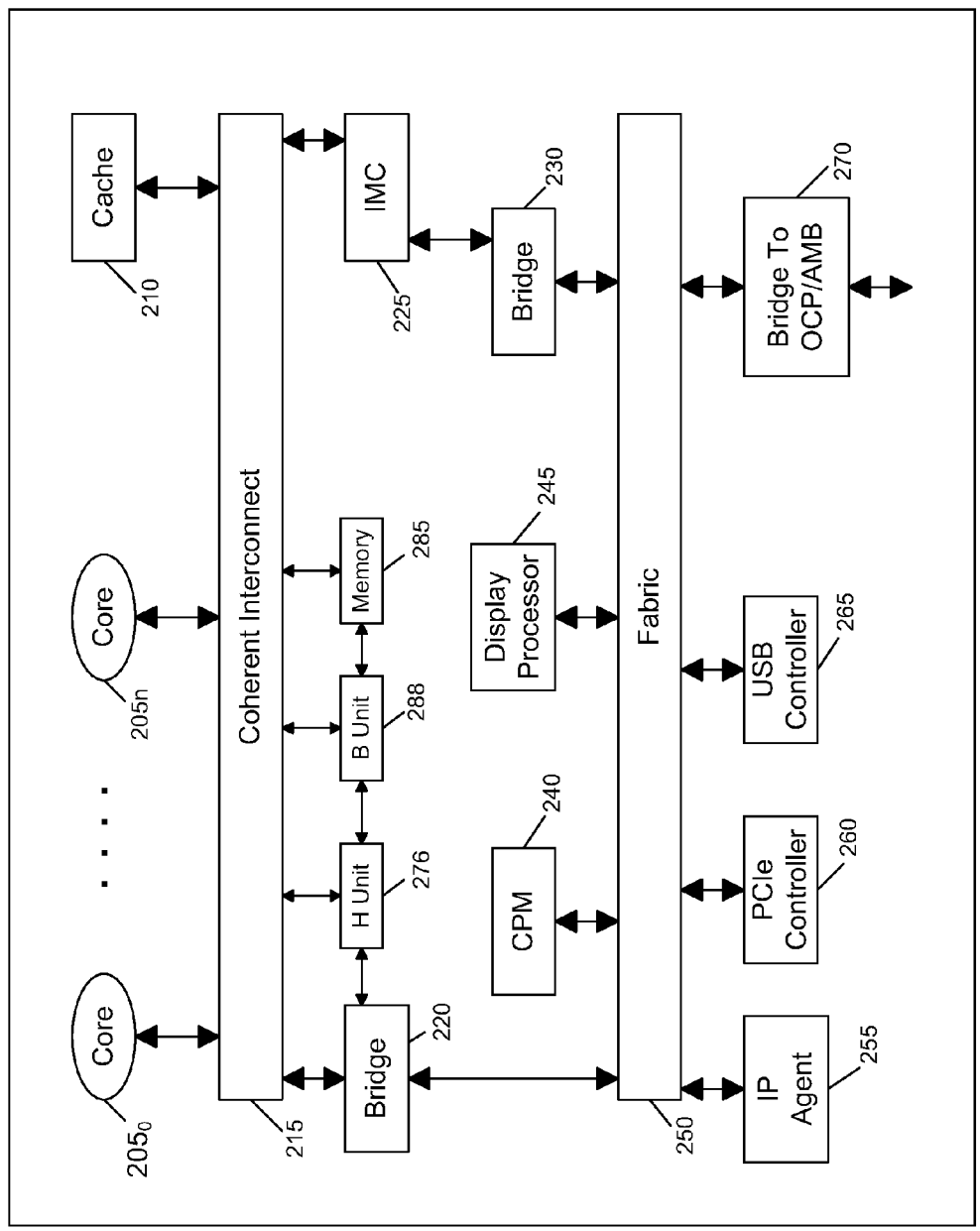
FIG. 3 is a high level block diagram of a SoC in accordance with an embodiment of the invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 225 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single "IP Agent" is labeled as such, other IP agents are included in the figure and many other such agents are possible in different embodiments. Regarding the embodiment of FIG. 3, B unit 288 and H unit 276 are both IP blocks. H unit 276 determines whether a transaction from any of cores (e.g., core 205$n$) should go to memory (e.g., memory 285) or to a south complex, which may couple to universal serial bus (USB) controller 265, SATA controller, and the like. B unit 288 forwards core transactions (e.g., core 205$n$) to memory (e.g., memory 285).

In addition, to enable communication with other on-chip devices, fabric 250 may further communicate with a PCIe™ controller 260 and USB controller 265, both of which can communicate with various devices according to these protocols. Finally, shown in the embodiment of FIG. 3 is bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
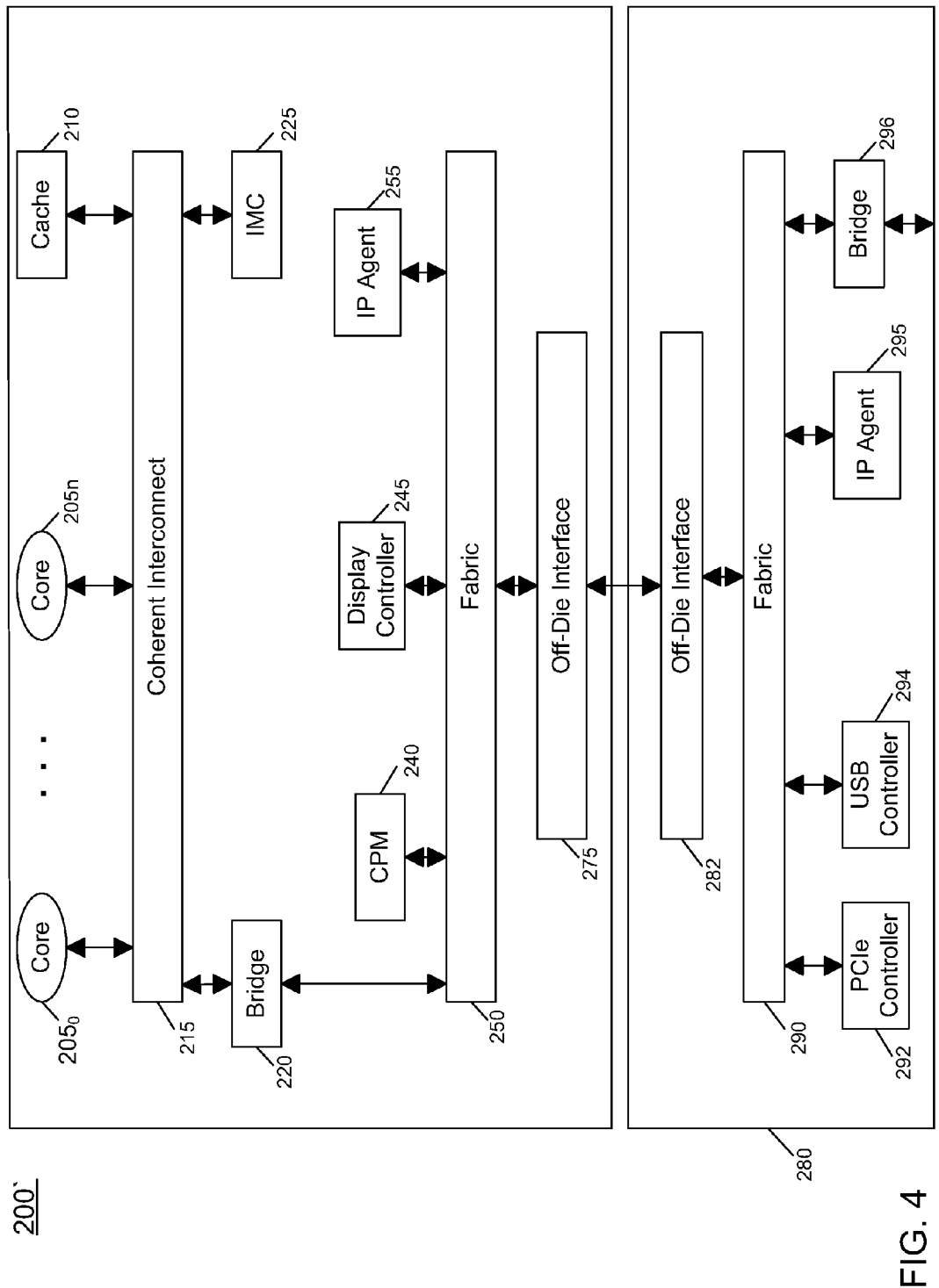
FIG. 4 is a block diagram of a system in accordance with another embodiment of the invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

One method for failure propagation includes reporting the failure through multiple layers of hardware and software. Returning to FIG. 3, core 205$n$ reads location X in memory 285 (e.g., DDR SDRAM). Core 205$n$ may be expecting data Z. However, memory 285 may suffer a failure and may return incorrect memory content, such as data Y, to core 205. Data Y may be corrupt, be of the wrong data type, and the like. Core 205$n$ may detect a fault (e.g., error condition) and flag this failure. The software layer in an operating system (OS), known as a "fault handler", may then be called. A fault handler includes programming language constructs or computer hardware mechanisms designed to handle the occurrence of exceptions that change the normal flow of program execution. The fault handler may take actions leading to a double or triple fault shutdown when, for example, memory block 285 keeps returning corrupted data to core 205$n$. This failure may cause a kernel panic, blue screen, or shutdown for the user.

A double fault exception may occur if the processor encounters a problem while trying to service a pending interrupt or exception. An example situation when a double fault may occur is when an interrupt is triggered but the segment in which the interrupt handler resides is invalid. For example, the interrupt handler may be located in faulty location X of memory 285. If the processor encounters a problem when calling the double fault handler, a triple fault is generated and the processor shuts down. Some processors may save state information to predefined and reserved machine registers. A double fault may then be a situation where another exception happens while the processor is still using the contents of these registers to process the exception.

A triple fault may be an exception generated by the processor when an exception occurs while the processor is trying to invoke the double fault exception handler, which itself handles exceptions occurring while trying to invoke a regular exception handler. Processors may cause a shutdown cycle to occur when a triple fault is encountered. This may cause hardware to initiate a processor reset which in turn may cause the whole computer system, which includes the processor, to reboot.

A kernel panic, "blue screen" and the like are various terms for actions taken by various operating systems upon detecting an internal fatal error from which it cannot safely recover. The kernel routines that handle panics are generally designed to output an error message to the console, dump an image of kernel memory to disk for post-mortem debugging, and then either wait for the system to be manually rebooted, or initiate an automatic reboot. Then, to "back track" the failure on the system level extra hardware may be needed to trace a user visible failure back to the initial hardware error condition.

In some instances, memory corruption may only get detected when, for example, the caches (e.g., cache 210 of FIG. 3) get flushed or a wbinvd instruction (Write Back and Invalidate Cache) is executed.

However, in one embodiment error detection is sped up. This may be based at least in part on fabric (e.g., IOSF) error forwarding. This may occur in a multi-clock domain SOC. The embodiment may detect and flag a processor error (e.g., hardware error or failure) relatively close in time to when the failure occurs on the fabric based SOC system.

Returning again to FIG. 3, core 205$n$ may read location X in memory 285. Core 205$n$ may be expecting data Z. However, memory 285 may suffer a failure and may return incorrect memory content, such as data Y, to core 205. Data Y may be corrupt, be of the wrong data type, and the like.

Core 205$n$ may detect a fault (e.g., error condition) and flag this failure. Core 205 may have hardware to detect the fault/exceptions. For example, with an Intel® Atom™ processor the "Front-End Cluster", "Integer Execution Cluster", and/or "Memory Execution Cluster" may detect various types of instruction-based or external event-based errors.

However, upon detection of a fault, instead of just proceeding to call a fault handler, an embodiment may log the error (e.g., using a core) and microcode (e.g., processor microcode coupled to core 205n) may issue a related fabric based message. In one embodiment the fabric message consists of a destination ID, source ID, message payload, and data payload. Source ID may relate to processor 205n and destination ID may relate to any IP agent, such as agent 255. The message may include a hexadecimal opcode such as 0xF2, 0xF4, and the like and the data payload may include, for example, 0x0.

Core 205n may forward the fabric based message through system fabric 250, included in SOC system 200, to IP agent 255. IP blocks are interconnected together using, for example, the IOSF protocol. Such IP blocks can be of varying types, including general-purpose processors such as in-order or out-of-order cores, power management controller (PMC)/power management unit (PMU), fixed function units, graphics processors, IO controllers, display controllers, media processors, power management controllers among many others.

The PMC (also called PMU) may include a microcontroller that governs power functions of digital platforms (e.g., system 200). This microcontroller may include firmware, software, memory, a processor or controller, input/output functions, timers to measure intervals of time, as well as analog to digital converters to measure the voltages of the main battery or power source of the computer. The PMU may control power-consuming functions in system 200, run diagnostics on various power-related operations, and check those diagnostics against energy settings to allow the PMC to actively manage power consumption.

Based on receiving the message, the IP agents (e.g., PMC of IP block 255) can trigger actions such as, for example, toggling on/off chip pins such as a General Purpose Input/Output (GPIO) pin (which may be connected to a light emitting diode (LED), thereby causing a message visible to a user), stopping the clock in a multiclock domain, forwarding an interrupt to processor 205n, generating an interrupt based on screen message, and/or various user defined actions that may alert the user to error and the source of the error.

While core 205n is used to, for example, detect an error, create a message, and forward a message (see above), please note these tasks may be performed by other cores (e.g., core 205$_0$,) or by a combination of cores (e.g., 205$_0$ and 205n) and still be said to be performed by a processor (albeit one with several cores).

FIG. 6 includes a pseudocode example for message processing by a processor as described immediately above.

Figure 5:
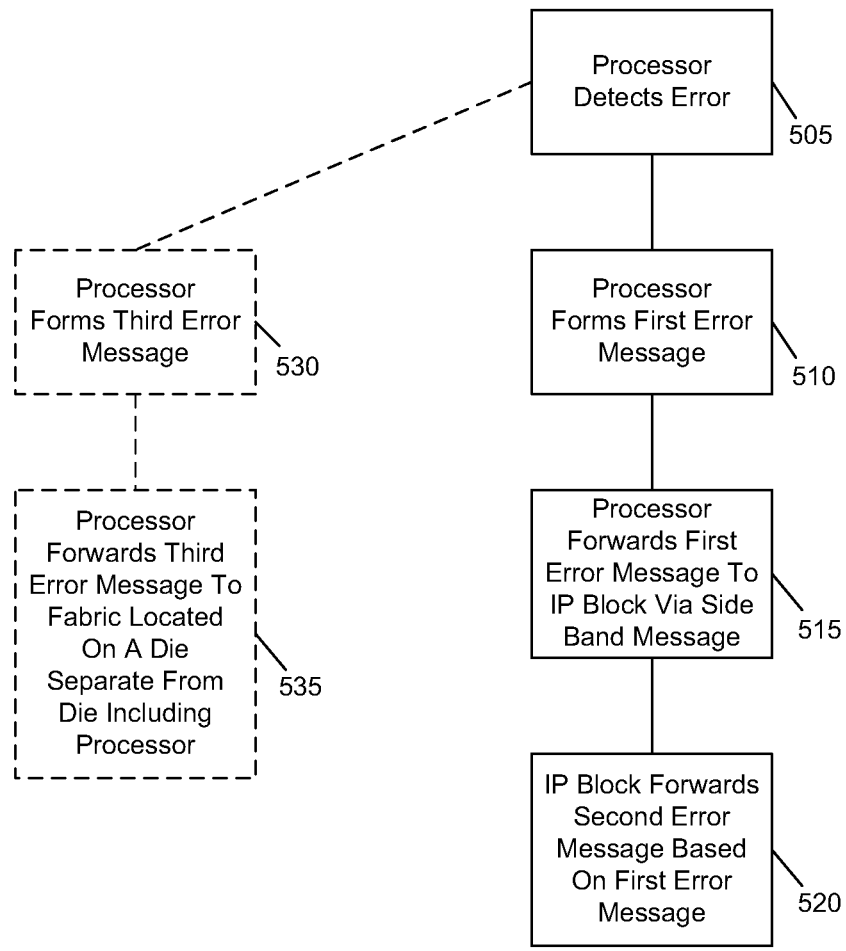
FIG. 5 is a schematic flow diagram for error message processing in an embodiment of the invention.

FIG. 5 is a schematic flow diagram for error message processing in an embodiment of the invention. Such a process allows for detecting the failure relatively near the time of occurrence and does not depend on the system to shutdown for user detection (or other user visible symptoms, such as "blue screen" or kernel panic, where the elapsed time from failure to user detection is very high). Such a process captures the failure at nearly the time of occurrence. In an embodiment, the process uses processor microcode to issue an IOSF side band message to trigger system failure.

Block 505 of process 500 includes a processor (cores 205$_0$, 205n), included in a first die, detecting a first error. Hardware such as the Atom™ processor's "Front-End Cluster", "Integer Execution Cluster", and/or "Memory Execution Cluster" may facilitate such detection. The error may include, for example, a memory corruption error.

In block 510, the processor formulates a first error message based on the detected first error. As noted above, the first error message may include, for example, destination ID, source ID, message payload, and data payload.

In block 515, the processor may forward the first error message, via a first fabric (e.g., fabric 250) included on the first die, to a first IP agent (i.e., IP block 255). The first IP agent may include one of, for example, a graphics processor, IO controller, display controller, media processor, and PMC. The "forwarding" may be done via a side band message. Further, the first IP agent may (in some embodiments) be included in the same die as the processor. The message may be forwarded to the IP agent via a first side band interface (e.g., sideband interface fabric 116 of FIG. 2) included in the processor and a second side band interface (e.g., sideband interface 144 of IP agent 140 in FIG. 2) included in the first IP agent. The side band interfaces, as well as the message itself, may adhere to fabric specification (e.g., IOSF).

Also, this forwarding may comprise forwarding the first error message directly from the fabric to the first IP agent. In non-fabric based systems (e.g., conventional main stream CPU design) there may be no direct way of communicating to, for example, the south complex from the CPU. However, in a fabric based system fabric side band message communication and fabric error forwarding can be used to trigger error detection. This reduces the circuitry needed to "trace back" an error.

In block 520 the first IP agent issues a second error message based on the first error message. This second message may be forwarded independently of all operating system fault handler messages. For example, the second message may be created and forwarded regardless of whether a fault handler is called. The second error message may, directly or indirectly, perform some user defined action to detect failure such as, for example, manipulate a GPIO pin coupled to a LED to alert a user to the fault. As another example, a PMU included in IP block 255 may be programmed to respond to a side band message from core 205n to log and detect any error at the system level.

In an embodiment, in block 530 (depicted in dashed lines to connote the block as an alternative or additional route to the route depicted in solid lines) the processor, having detected another error or possibly the same error of block 505, forms a third error message. The third error message may have a makeup similar to the message of block 510. In block 535 the processor forwards the third error message, via the first fabric included on the first die, to a second fabric included in a second die. The second fabric and the first fabric may both adhere to an IOSF standard. For example, see fabrics 250 and 290 of FIG. 4.

As used herein a processor or controller may include control logic intended to represent any of a wide variety of control logic known in the art and, as such, may be implemented as a microprocessor, a micro-controller, a field-programmable gate array (FPGA), application specific integrated circuit (ASIC), programmable logic device (PLD) and the like. A processor may refer to any device or portion of a device that processes electronic data from registers and/or memory to transform that electronic data into other electronic data that may be stored in registers and/or memory. A processor may be distributed, may include different cores, and the like. For example, the various portions of FIG. 5 may conducted by various cores of a processor.

Thus, one embodiment includes a SoC based on a fabric (e.g., IOSF fabric) as the interface between on die blocks. The aforementioned embodiments may allow a system to detect processor (e.g., CPU) triggered hardware errors by utilizing fabric based error forwarding.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, etc. When the data is accessed by a machine, the machine may respond by performing tasks, defining abstract data types, establishing low-level hardware contexts, and/or performing other operations, as described in greater detail herein. The data may be stored in volatile and/or non-volatile data storage. For purposes of this disclosure, the terms "code" or "program" cover a broad range of components and constructs, including applications, drivers, processes, routines, methods, modules, and subprograms. Thus, the terms "code" or "program" may be used to refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory storage medium having instructions stored thereon for causing a system to perform a method comprising:
   a processor, included in a first die, detecting a first error;
   the processor formulating a first error message based on the detected first error;
   the processor forwarding the first error message, via a first fabric included in the first die and a first side band message, to a first intellectual property (IP) agent that is included in the first die; and
   the first IP agent issuing a second error message based on the first error message.

2. The at least one medium of claim 1, wherein the first IP agent includes one of a graphics processor, input/output (TO) controller, display controller, media processor, and power management controller.

3. The at least one medium of claim 1, wherein the first error includes a memory corruption error.

4. The at least one medium of claim 1, the method comprising the processor forwarding the first error message to the first IP agent via a first side band interface included in the processor and a second side band interface included in the first IP agent.

5. The at least one medium of claim 4, wherein the first error message and the first and second side band interfaces adhere to an integrated on-chip system fabric (IOSF) specification.

6. The at least one medium of claim 1, the method comprising forwarding the first error message directly from the first fabric to the first IP agent with no intervening components between the first fabric and the first IP agent.

7. The at least one medium of claim 1, wherein the second error message performs one of manipulating a General Purpose Input/Output (GPIO) pin and performing a user defined action that alerts a user to the first error.

8. The at least one medium of claim 1, the method comprising the first IP agent issuing the second error message independently of all operating system fault handler messages and all cache flushes of any cache coupled to the processor.

9. The at least one medium of claim 1, the method comprising the processor forwarding a third error message, via the first side band message and the first fabric, to a second fabric included in a second die.

10. The at least one medium of claim 1, wherein the second error message performs a user defined action that alerts a user to the first error.

11. The at least one medium of claim 1, the method comprising the processor forwarding the first error message, via the first fabric and not via a primary interface fabric included in the first die, wherein the first fabric includes a sideband interface fabric.

12. An apparatus comprising:
    a processor included in a first die;
    a first fabric, coupled to the processor, included in the first die; and
    a first intellectual property (IP) agent, coupled to the first fabric, included in the first die;
    wherein the processor is to formulate a first error message based on a detected first error and forward the first error message, via the first fabric, to the first IP agent; and the first IP agent is to issue a second error message based on the first error message;
    wherein the processor is to forward the first error message to the first IP agent, via a first side band message.

13. The apparatus of claim 12, wherein the first IP agent includes one of a graphics processor, input/output (TO) controller, display controller, media processor, and power management controller.

14. The apparatus of claim 12, wherein the first error includes a memory corruption error.

15. The apparatus of claim 12, wherein the processor is to forward the first error message to the first IP agent via a first side band interface included in the processor and a second side band interface included in the first IP agent.

16. The apparatus of claim 15, wherein the first error message and the first and second side band interfaces adhere to an integrated on-chip system fabric (IOSF) specification.

17. The apparatus of claim 12, wherein the first fabric is to forward the first error message directly from the first fabric to the first IP agent.

18. The apparatus of claim 12, wherein the processor is to forward a third error message, via the first fabric included on the first die, to a second fabric included in a second die.

19. A computer system including the first and second dies of claim 18.

* * * * *